United States Patent [19]

Takahashi

[11] 4,025,471
[45] May 24, 1977

[54] NOVEL RESIN AND COATING COMPOSITION CONTAINING SAME

[75] Inventor: Mitsuru Takahashi, Hirakata, Japan

[73] Assignee: Nippon Paint Co., Ltd., Osaka, Japan

[22] Filed: Oct. 29, 1975

[21] Appl. No.: 626,919

Related U.S. Application Data

[62] Division of Ser. No. 400,819, Sept. 26, 1973, Pat. No. 3,932,562.

[30] Foreign Application Priority Data

Sept. 2, 1972  Japan .............................. 47-98782

[52] U.S. Cl. .............................. 260/16; 260/22 CB; 260/32.8 R; 260/32.8 EP; 260/33.2 R; 260/33.2 EP; 260/33.4 R; 260/33.4 EP; 260/33.4 UR; 260/33.6 R; 260/33.6 EP; 260/33.6 UB; 260/835; 260/842; 260/843; 260/850; 260/856; 260/859 R; 260/873; 428/480

[51] Int. Cl.² .................... C08L 1/10; C08L 67/06

[58] Field of Search .............. 260/873, 16, 20 CB, 260/835, 842, 843, 850, 856, 859 R, 32.8 R, 32.8 EP, 33.2 R, 33.2 EP, 33.4 R, 33.4 UR, 33.6 R, 33.6 EP, 33.6 UB, 17

[56] References Cited

UNITED STATES PATENTS

| | | | |
|---|---|---|---|
| 2,374,814 | 5/1945 | Gutkin | 260/842 |
| 2,598,663 | 6/1952 | Kropa | 260/16 |
| 3,036,023 | 5/1962 | Rogers, Jr. et al. | 260/835 |
| 3,098,835 | 7/1963 | Gaylord | 260/856 |
| 3,634,351 | 1/1972 | Kimura et al. | 260/873 |
| 3,689,310 | 9/1972 | Johnson et al. | 260/859 R |

OTHER PUBLICATIONS

Chemical Abstracts vol. 74, 1971 pp 127, 198d

*Primary Examiner*—J. Ziegler
*Attorney, Agent, or Firm*—Wenderoth, Lind & Ponack

[57] ABSTRACT

A resin produced by graft polymerizing at least one ethylenically unsaturated polymerizable compound on a mercapto group-containing alkyd resin, which is useful as an essential component in coating compositions such as paints.

4 Claims, No Drawings

NOVEL RESIN AND COATING COMPOSITION CONTAINING SAME

This is a division of application Ser. No. 400,819, filed Sept. 26, 1973, now U.S. Pat. No. 3,932,562.

The present invention relates to a novel resin comprising a mercapto group-containing alkyd resin and at least one ethylenically unsaturated polymerizable compound graft polymerized thereon. It also relates to a coating composition containing the said resin as an essential component.

Hitherto, vinylated alkyd resins have been produced by various methods such as the graft polymerization of a vinylic monomer to an alkyd resin modified with an unsaturated oil or an unsaturated fatty acid, the graft polymerization of a vinylic monomer to an unsaturated polyester resin, and the like. These conventional methods for production of vinylated alkyd resins comprise the graft polymerization of a vinylic monomer to an unsaturated group of an alkyd resin. In such graft polymerization, however, the gel formation is apt to occur during the reaction when the content of the unsaturated group in the alkyd resin is large, so that there can be only employed alkyd resins with a relatively small content of the unsaturated group so as to avoid the gel formation. Consequently, the grafting rate is small, and the obtained resin has a poor compatibility with the ungrafted vinylic resin and alkyd resin. In combining such resins with other vinylic monomers, their kinds and amounts are restricted, and only a small number of them are practically utilizable. Thus, a sufficient exhibition of the excellent characteristics of both the vinylic resin and the alkyd resin has not been expected.

As the result of the extensive study, it has now been found that, by introducing a mercapto group into an alkyd resin and grafting an ethylenically unsaturated polymerizable compound on the mercapto group by chain transfer, there is produced a novel graft polymer which is provided with a variety of advantageous properties suitable for the use as a component in coating compositions such as paints.

Accordingly, a main object of the present invention is to provide a novel resin which can be advantageously used for paints to afford excellent properties such as smoothness, gloss, workability, dispersing ability to pigments, flexibility, adhesion, chemical resistance, impact resistance and the water resistance. Another object of this invention is to provide a coating composition containing the said resin as the main component. These and other objects of the invention will be apparent to those conversant with the art from the foregoing and subsequent descriptions.

According to the present invention, a resin is prepared by graft polymerization of a mercapto group-containing alkyd resin with at least one ethylenically unsaturated polymerizable compound.

The mercapto group-containing alkyd resin may be prepared by introducing a mercapto group into the molecule of an alkyd resin in the course of or after the preparation of the alkyd resin.

In one of the typical procedures for preparation of such mercapto group-containing alkyd resin, at least one polycarboxylic acid and at least one polyol are subjected to polycondensation in the optional presence of at least one modifier (e.g. aliphatic carboxylic acids, epoxy resins, phenolic resins) in a conventional manner but in the coexistence of at least one mercapto group-containing compound such as a polyol in which at least one hydroxyl group is replaced by a mercapto group (e.g. monothioethylene glycol, monothiopropylene glycol, monothioglycerol, ethanedithiol, 1,4-butanedithiol, 1,2-dithioglycerol, 1,3-dithioglycerol, 1,3-dimercaptoacetone, trithioglycerol) or a mercaptocarboxylic acid (e.g. thioglycollic acid, mercaptopropionic acid, thiolactic acid, thiomalic acid, thiosalicylic acid). As in a conventional manner, the polycondensation may be effected usually in an inert atmosphere (e.g. carbon dioxide, nitrogen, xylene vapor), preferably in the presence of an acidic catalyst (e.g. p-toluenesulfonic acid, phosphoric acid) or a basic catalyst (e.g. lead oxide, lithium naphthenate, calcium hydroxide). In another typical procedure, the alkyl resin prepared in a conventional manner may be reacted with a mercapto group-containing compound as mentioned above or a cyclic sulfide (e.g. ethylene sulfide, propylene sulfide, butylene sulfide, isobutylene sulfide). Among these procedures, presently preferred is the one using a mercaptocarboxylic acid, particularly thioglycollic acid, as the mercapto group-containing compound, because of its easy availability.

The content of the mercapto group in the mercapto group-containing alkyd resin should be in a range of from $1 \times 10^{-5}$ to $1 \times 10^{-2}$ gram equivalent/g, preferably from $1 \times 10^{-4}$ to $5 \times 10^{-3}$ gram equivalent/g. When the content is smaller than the lower limit, the obtained resin becomes poor in uniformity and transparency. On the other hand, when the content exceeds the upper limit, a low molecular weight polymer is produced and the properties of the coating film obtained therefrom are deteriorated.

As the ethylenically unsaturated polymerizable compound to be used, there may be exemplified (1) esters of acrylic acid and methacrylic acid with alkanols having 1 to 15 carbon atoms (e.g. ethyl acrylate, n-butyl acrylate, isobutyl acrylate, t-butyl acrylate, 2-ethylhexyl acrylate, dodecyl acrylate, methyl methacrylate, ethyl methacrylate, n-butyl methacrylate, isobutyl methacrylate, t-butyl methacrylate, 2-ethylhexyl methacrylate, lauryl methacrylate), (2) styrene and its derivatives (e.g. styrene, α-methylstyrene, vinyltoluene, p-t-butylstyrene), (3) acrylonitrile and methacrylonitrile, (4) ethylenically unsaturated glycidyl carboxylates (e.g. glycidyl acrylate, glycidyl methacrylate), (5) ethylenically unsaturated monomers having at least one hydroxyl group (e.g. 2-hydroxyethyl acrylate, 2-hydroxypropyl acrylate, 1-methyl-2-hydroxyethyl acrylate, 2-hydroxyethyl methacrylate, 2-hydroxypropyl methacrylate, 1-methyl-2-hydroxyethyl methacrylate, polypropylene glycol monomethacrylate, glycerol monomethacrylate, 3-chloro-2-hydroxypropyl methacrylate), (6) ethylenically unsaturated carboxylic acids (e.g. acrylic acid, methacrylic acid, crotonic acid, itaconic acid, fumaric acid, maleic acid), (7) ethylenically unsaturated compounds having at least one blocked isocyanate group such as the addition product between a polyisocyanate compound (e.g. hexamethylene diisocyanate, tolylene diisocyanate, isophorone diisocyanate, polyisocyanate adduct) having at least one free isocyanate group and at least one isocyanate group blocked by a conventional blocking agent (e.g. phenols, lactams, active methylene compounds, alcohols, amines, oximes) and an ethylenically unsaturated compound having at least one hydroxyl group (e.g. 2-hydroxyethyl methacrylate, 2-hydroxyethyl acrylate, 2-hydroxypropyl methacrylate, acrylic acid, methacrylic acid, itaconic acid, N-methylolacrylamide) and the addition product between an ethylenically unsaturated compound having at least one free isocyanate group and a blocking agent, (8) acrylamide and methacrylamide and their derivatives (e.g. N-methylolacrylamide, N-alkoxymethylacrylamide having an alkyl moiety of 1 to 14 carbon atoms, diacetone acrylamide, hydroxymethyldiacetone acrylamide, N-methylolmethacrylamide, N-alkoxymethylmethacrylamide having an alkyl moiety of 1 to 14 carbon atoms), etc.

The proportion of the mercapto group-containing alkyd resin and one or more ethylenically unsaturated polymerizable compounds to be graft polymerized thereon may be from 5:95 to 70:30 in weight ratio, preferably from 10:90 to 60:40 in weight ratio.

The esters of acrylic acid and methacrylic acid with alkanols having 1 to 15 carbon atoms may be, if used, usually in an amount of 30 to 100% by weight on the basis of the total weight of the ethylenically unsaturated polymerizable compound(s). The use of such esters can provide the coating film formed by the resulting resin with good transparency, weathering durability, chemical resistance and the like.

The styrene and its derivatives may be used in an amount of not more than 50% by weight on the basis of the total weight of the ethylenically unsaturated polymerizable compound(s). They are advantageous in good copolymerizability with other monomers and can impart an excellent gloss to the coating film formed with the resulting resin. When, however, the amount exceeds about 50% by weight, an unfavorable influence will be exerted upon the weathering durability of the film.

The amount of acrylonitrile and methacrylonitrile may be not more than 10% by weight on the basis of the total weight of the ethylenically unsaturated polymerizable compound(s). They exert an excellent chain transfer effect to the mercapto group-containing alkyd resin so that the grafting rate can be improved and the resulting resin shows a good uniformity. But, when the amount is larger than 10% by weight, the resultant resin is colored, or the film becomes yellowish at baking.

The amount of the ethylenically unsaturated glycidyl carboxylates may be 5 to 40% by weight on the basis of the total weight of the ethylenically unsaturated polymerizable compound(s). When it is less than about 5% by weight, the degree of cross linkage becomes small so that the physical properties of the film (e.g. strength, solvent resistance, chemical resistance) are deteriorated. When it exceeds about 40% by weight, the degree of cross linkage becomes so large that the film becomes fragile, or unreacted epoxy groups exert a bad influence upon the weathering durability. By the simultaneous use of the glycidyl compounds with a organic compound having two or more carboxyl groups, a self-curing coating composition can be obtained.

The ethylenically unsaturated monomers having at least one hydroxyl group may be used in an amount of not more than 25% by weight on the basis of the total weight of the ethylenically unsaturated polymerizable compound(s). By their use, there is obtained a resin of good uniformity. It produces a good effect to the gloss and solvent resistance of the film. The use may be necessitated, especially in case that a cross-linking agent such as an aminoplast resin, a polyisocyanate compound or a blocked isocyanate compound is incorporated. When the amount is larger than about 25% by weight, the water resistance of the film becomes lowered.

When the ethylenically unsaturated carboxylic acids are used in an amount of not more than 5% by weight on the basis of the total weight of the ethylenically unsaturated polymerizable compound(s), there may be obtained a resin of thermoplastic property. On dispersing a filler such as a pigment into the resin or a solution of the resin, the presence of a carboxyl group in the resin is effective in maintaining a good dispersion state. When the amount exceeds about 5% by weight, the film becomes insufficient in gloss, weathering durability and water resistance.

In case of the production of a resin of thermosetting property, the ethylenically unsaturated carboxylic acids may be employed in an amount of 5 to 40% by weight on the basis of the total weight of the ethylenically unsaturated polymerizable compound(s). In this case, the use of a cross-linking agent such as an epoxy compound or an epoxy resin having two or more epoxy groups is essential.

The amount of acrylamide and methacrylamide and their derivatives may be 5 to 40% by weight on the basis of the total weight of the ethylenically unsaturated polymerizable compound(s). In case of using acrylamide or methacrylamide, it is favorable to treat the produced resin with formaldehyde and, if necessary, further with an alcohol so as to convert a part or all of the acrylamide or methacrylamide moiety into the one where a methylol group or an alkylated methylol group is present. When the derivatives of acrylamide or methacrylamide are used, they may be cured by the self-condensation or reacted with the hydroxyl group or the carboxyl group in the alkyd resin to form a bridge structure.

The ethylenically unsaturated compounds having at least one blocked isocyanate group may be used in an amount of 5 to 40% by weight on the basis of the total weight of the ethylenically unsaturated polymerizable compound(s).

When the preparation of a thermosetting resin is intended, the use of two or more of the ethylenically unsaturated glycidyl carboxylates, the ethylenically unsaturated monomers having at least one hydroxyl group, the ethylenically unsaturated carboxylic acids, acrylamide and methacrylamide and their derivatives and the ethylenically unsaturated compounds having at least one blocked isocyanate group in an amount of 5 to 40% by weight on the basis of the total weight of the ethylenically unsaturated polymerizable compound(s) is favorable.

The polymerization of the mercapto group-containing alkyd resin with the ethylenically unsaturated polymerizable compound(s) may be effected in a per se conventional procedure. For instance, the polymerization may be carried out in the presence of a polymerization initiator such as an azo compound (e.g. azobisisobutyronitrile, azobismethylvaleronitrile) or a peroxide (e.g. lauroyl peroxide, stearoyl peroxide, benzoyl peroxide, di-t-butyl peroxide, di-t-cumyl peroxide, t-butyl peroxyisobutyrate, methylethyl ketone peroxide, ammonium persulfate, potassium persulfate), if necessary, in the co-existence of a chain transfer agent such as a mercaptan (e.g. lauroyl mercaptan, dodecyl mercaptan), a disulfide (e.g. diisopropylxanthogen disulfide) or a halide (e.g. carbon tetrachloride, chloroform) at 40° to 160° C for 2 to 15 hours.

The ethylenically unsaturated polymerizable compound(s) may be subjected to the reaction all at once or in portions in several times. In other words, the reaction may be carried out in a single step or multi steps. The ethylenically unsaturated polymerizable compound in the initial step may be same as or different from that in ay subsequent step.

The reaction between the mercapto group-containing alkyd resin and the ethylenically unsaturated polymerizable compound(s) proceeds first to produce a graft polymer and, by the emulsifying effect of this graft polymer, the polymer as subsequently produced can be maintained in a homogeneous state. In order to attain a higher grafting rate at initial stage of the reaction, the use of a peroxide as the polymerization initiator and of an ethylenically unsaturated polymerizable compound which is readily subjected to the chain transfer to the mercapto group is favorable. In the subsequent stage of the reaction, an azo compound which is not so readily subjected to the chain transfer may be used as a polymerization initiator, but a peroxide can also be used advantageously. When the ethylenically unsaturated polymerizable compounds are subjected to the reaction in portions, it is the most econominal and practical to divide them into two portions.

The reaction may be performed in any conventional made of polymerization, i.e. solution polymerization, suspension polymerization, bulk polymerization or emulsion polymerization. In most cases, the adoption of solution polymerization or suspension polymerization is preferred. The solution polymerization is carried out in a solvent or a mixture of solvents, and the resultant solution may be as such employed as a coating composition, or after elimination of the solvent, the residual product is used as a resin.

In case of the suspension polymerization, for instance, an aqueous solution of a suspension stabilizer (e.g. a natural high molecular compound or its derivative, a water soluble synthetic high molecular compound, a hardly soluble salt, an inorganic high molecular compound, a metal or metal oxide in powder form) and a small amount of an aqueous buffer solution of a stabilization promotor (e.g. a phosphate, a surface active agent) are added to a solution containing the said mercapto group-containing resin, the ethyenically unsaturated polymerizable compound and the polymerizable initiator, if necessary, with the chain transfer agent, and the resulting mixture is rapidly stirred whereby fine particles of the resin of 0.01 to 2 mm in diameter are formed. The mixture is heated at about 40° to 95° C for 2 to 7 hours with stirring to complete the reaction. The produce resin particles are collected by filtration and dried.

The accomplishment of the graft polymerization may be confirmed by detecting no mercapto group in the produced resin.

In the graft polymerization of this invention, the ethylenically unsaturated polymerizable compound(s) are grafted on the mercapto group-containing alkyd resin by chain transfer with a high grafting rate to give a resin. It is notable that the gel formation as frequently seen in the grafting of a polymerizable monomer on an alkyd resin having a copolymerizable unsaturation hardly occurs in the graft polymerization of the invention.

The thus produced resin comprises a graft polymer wherein the alkyd resin having the ethylenically unsaturated polymerizable compound(s) in a polymeric form grafted thereon as well as the ungrafted alkyd resin and the polymer of the ethylenically unsaturated polymerizable compound(s).

When the content of the mercapto group-containing alkyd resin component in the produced resin is below about 5% by weight, the properties of the alkyd resin may not be reflected on the obtained resin or the resin may not exhibit the characteristics as the graft polymer. On the contrary, when the content exceeds about 70% by weight, the properties of the acrylic polymer are not reflected and the mercapto group is apt to remain unreacted to exert bad influences on the stability on storage or the weathering durability.

The resin of the invention possesses a good compatibility with other resins and additives such as cellulose derivatives, acrylic resins, alkyd resins, ester gums, maleic acid resins, phenol resins, epxoy resins, aminoplast resins, polyisocyanate compounds, blocked polyisocyanate compounds, organic compounds having two or more carboxyl groups and the like. By incorporating these resins, the resultant composition can afford a coating film more excellent in various properties such as appearance, gloss, thickness, processability, water resistance, alkali resistance, acid resistance, solvent resistance, stain resistance, weathering durability and strength with good workability on coating.

The incorporation of a cellulose derivative may be attempted in some cases. Among various cellulose derivatives, the most preferred is cellulose acetate butyrate which is excellent in gloss, color and gloss retention, weathering durability, heat stability and thermal fluidity. Particularly, the one having a viscosity of 0.1 to 6 seconds (ASTM D-817- 65 (Formula A)) is suitable for preparing a composition for paints, assuring a good workability on coating. The amount of the cellulose derivative to be added may be equal to or less than the weight of the resin of the invention. Other cellulose derivatives such as nitrocellulose may be also used.

When desired, acrylic resins or alkyd resins may be incorporated into the resin of the invention so as to obtain a composition utilizable for various purposes. The favorable amount to be incorporated is 150 parts by weight or less to 100 parts by weight of the resin.

By the incorporation of a cross-linking agent such as an aminoplast resin, a polyisocyanate compound, a blocked polyisocyanate compound or an organic compound having two or more carboxyl groups or its anhydride, the film can be more improved in appearance, gloss and other physical and chemical properties.

Examples of the organic compound having two or more carboxyl groups and its anhydride are polycarboxylic acids (e.g. adipic acid, sebacic acid, phthalic acid, trimellitic acid) and their anhydrides (e.g. phthalic anhydride, trimellitic anhydride), polyester resins obtained by condensation of polyols with excessive polycarboxylic acids, etc. The amount to be used may be 3 to 5 parts by weight to 100 parts by weight of the resin of the invention. It is preferred to adjust the equivalent ratio of epoxy groups and carboxyl groups to 0.8 to 1.2. The formed coating film may be usually dried at about 120° to 220° C.

The aminoplast resin mentioned above is the additive condensation product of urea, melamine or guanamines with an aldehyde (e.g. formaldehyde) or its etherification product with an alcohol. It may be used in an amount of 5 to 40 parts by weight to 100 parts by weight of the resin. When the aminoplast resin is used, the drying of the coating film is preferably carried out at about 80° to 200° C.

The polyisocyanate compound includes a polyisocyanate adduct obtained by the addition of a diisocyanate (e.g. hexamethylenediisocyanate, tolylenediisocyanate) to a polyol of low molecular weight, a polyisocyanate having a biuret structure and a polyisocyanate having an allophanate structure. The amount to be used may be 5 to 50 parts by weight to 100 parts by weight of the resin. The coating film is favorably dried at a temperature from room temperature to about 80° C.

The blocked polyisocyanate compound is the addition product of a diisocyanate or a polyisocyanate compound as mentioned above and a blocking agent (e.g. phenols, alcohols, lactams, active methylene compounds, amines, oximes). The amount to be used may be 5 to 60 parts by weight to 100 parts by weight of the resin. In case of the incorporation of the blocked polyisocyanate compound, it is preferred to employ a dissociation catalyst such as a base (e.g. triethylamine, N-methylmorpholine) or a metal compound (e.g. dibutyltin dilaurate, stannous chloride). The coating film is favorably dried at about 120° to 220° C.

As the epoxy compound, there may be exemplified triglycidyl isocyanate, a vinylic resin obtained by the copolymerization of glycidyl acrylate or glycidyl methacrylate with any other polymerizable monomer, a condensate of bisphenol A with epichlorohydrin, a condensate of novolak with epichlorohydrin, a diepoxy compound containing a polyether chain structure, an alicyclic epoxy resin, etc. The amount to be used is desired to be 5 to 40 parts by weight to 100 parts by weight of the resin. If necessary, there may be added a catalyst for cross-linking such as a Lewis acid (e.g. boron trifluroide), a base (e.g. benzyldimethylamine, 2-ethyl-5-methylimidazole, triethylene amine, N-methylmorpholine), a salt (e.g. boron trifluoride-monoethylamine complex salt, triethanolamine borate, stannous chloride), amn organometallic compound (e.g. stannous octylate, tetrabutyl titanate, dibutyltin dilaurate) or the like. The coating film is favorably dried at about 140° to 220° C.

As stated above, the resin obtained by the product invention shows a good compatibility with kinds of resins and, by their admixture, can acquire various excellent properties. Thus, it can be utilized for a variety of purposes and is especially suitable for paints.

On the practical use, the coating composition of the invention may be employed as solution or powder. In case of using as solution, the amount of the solvent may be usually from 40 to 80% by weight on the basis of the total weight of the solution. Examples of the solvent are an aromatic hydrocarbon (e.g. toluene, xylene), a ketone (e.g. acetone, methyl ethyl ketone, methyl isobutyl ketone), an ester (e.g. butyl acetate, ethylene glycol acetate monoethyl ether) and an ether alcohol (e.g. ethylene glycol monoethyl ether, ethylene glycol monobutyl ether), an aliphatic hydrocarbon (e.g. heptane, octane) and an alcohol (e.g. ethyl alcohol, butyl alcohol).

When used as the main component of a thermoplastic or thermosetting composition for coating in powder form, the resin of the invention is desired to have a glass transition temperature of 5° to 100° C. In case that the glass transition temperature is lower than 5° C, the maintenance of the powdery state is difficult at room temperature. On the other hand, when the glass transition temperature is higher than 100° C, the thermal fluidity at baking becomes decreased and a smooth coating film cannot be obtained. Further, the weight average molecular weight of the resin is favored to be $5 \times 10^3$ to $1 \times 10^5$. With the molecular weight smaller than $5 \times 10^3$, the obtained coating film is inferior in strength, solvent resistance, stain resistance and the like. With the molecular weight larger than $1 \times 10^5$, on the contrary, the thermal fluidity is decreased, and a smooth coating film is not formed.

The coating composition of the invention may be colored with a pigment usually employed for coloring of organic coating compositions such as an organic pigment (e.g. phthalocyanine blue or green) or an inorganic pigment (e.g. carbon black, titanium dioxide, aluminum flake).

The coating composition of the invention may be also incorporated with other additives such as a wetting agent, a conditioning agent, a flow control agent, a promoter for cross-linking and an antioxidizing agent.

The application of the coating composition of the invention may be executed by a conventional method. That is, when employed as a solution, the composition is applied by brushing, roller coating, spraying with compressed air or with a petroleum solvent of low boiling point, electrostatic spraying, and when as powders, it is applied by electrostatical coating or fluidized bed coating.

The coating composition of the invention may be applied to a variety of materials such as wood, glass, metal, stone, plastics and cloth.

Practical and presently preferred embodiments of the present invention are illustratively shown in the following Examples wherein parts and percentages are by weight unless otherwise indicated.

EXAMPLE 1

In a reaction vessel equipped with a stirrer, a thermometer, a cooler and an inlet for nitrogen gas, there are charged phthalic anhydride (332 parts), adipic acid (140 parts), trimethylolpropane (407 parts), neopentyl glycol (55 parts) and thioglycollic acid (150 parts). The contents are heated at 220° C for about 6 hours while introducing nitrogen gas into the reaction vessel. The reaction product is admixed with a solvent mixture consisting of "Solvesso 100" (trade name; manufactured by Esso Standard Oil Co., Ltd.) and ethylene glycol monobutyl ether (7:3) (594 parts) to give a resin solution, which contains 60.8% of non-volatile components and has an acid value of 50, a viscosity of $Z_1$ (Gardner bubble viscosity) and a color number of 2 (Gardner color number). The content of the mercapto group in the resin is $3.69 \times 10^{-4}$ gram equivalent/g.

The thus obtained resin solution (83 parts) is admixed with methyl methacrylate (10 parts), styrene (8 parts), n-butyl acrylate (22 parts), 2-hydroxyethyl methacrylate (6 parts), di-tert-butyl peroxide (1.5 parts) and the solvent mixture mentioned above (64 parts), and the mixture is heated at 135° C for about 5 hours to give a resin solution containing 50.4% of non-volatile components and having a viscosity of I, an acid number of 3.3 and a color number of 3. No mercapto group is detected in this resin solution. When the solution is evaporated to dryness, a uniform and transparent resin is obtained.

The above resin solution obtained by the graft polymerization (84 parts) is admixed with melamine-formaldehyde resin (trade name "Superbeckamine J-820"

manufactured by Dainippon Ink Chemical Ind. Co., Ltd.) (36 parts), titanium white (trade name "Tipake R-820" manufactured by Ishihara Sangyo Kaisha, Ltd.) (27 parts) and Cyanine Blue (4 parts) to make an enamel, which is applied on a zinc plate treated with a phosphate by the aid of a bar coater No. 26 and baked at 180° C for 90 seconds to form a film on the plate. The properties of the obtained film are shown in Table 1.

EXAMPLE 2

In the same reaction vessel as in Example 1, there are charged phthalic anhydride (385 parts), adipic acid (163 parts), trimethylolpropane (279 parts), neopentyl glycol (197 part) and thioglycollic acid (50 parts), and the contents are heated at 220° C for about 8 hours while introducing nitrogen gas therein. The reaction product is admixed with the solvent mixture mentioned in Example 1 (583 parts) to give a resin solution, which contains 59.6% of non-volatile components and has a viscosity of XY to Y, an acid value of 17.9 and a color number of 2. The content of the mercapto group in the resin is $3.30 \times 10^{-4}$ gram equivalent/g.

The thus obtained resin solution (117 parts) is admixed with methyl methacrylate (3.5 parts), styrene (3 parts), n-butyl acrylate (13 parts), 2-hydroxyethyl methacrylate (4 parts), acrylonitrile (4 parts), itaconic acid (2.5 parts), ditert-butyl peroxide (1.5 parts) and the solvent mixture as above (51 parts), and the mixture is heated at 140° C for about 5 hours to give a resin solution containing 51.5% of non-volatile components and having a viscosity of H, an acid value of 8.1 and a color number of 3. No mercapto group is detected in this resin solution. When the solution is evaporated to dryness, a uniform and transparent resin is obtained.

The above resin solution obtained by the graft polymerization is admixed with the same materials as in Example 1 to make an enamel, which is applied on a zinc plate treated with a phosphate by the aid of a bar coater No. 26 and baked at 180° C for 90 seconds to form a film on the plate. The properties of the obtained film are shown in Table 1.

EXAMPLE 4

In the same reaction vessel as in Example 1, there are charged phthalic anhydride (359 parts), adipic acid (152 parts), trimethylolpropane (354 parts), neopentyl glycol (114 parts) and thioglycollic acid (100 parts), and the contents are heated at 220° C for about 6 hours while introducing nitrogen gas therein. The reaction product is admixed with the solvent mixture mentioned in Example 1 (586 parts) to give a resin solution, which contains 59.9% of non-volatile components and has a viscosity of $Z_1$ to $Z_2$, an acid value of 39.7 and a color number of 1. The content of the mercapto group in the resin is $1.19 \times 10^{-4}$ gram equivalent/g.

A mixture of the thus obtained resin solution (84.5 parts), methyl methacrylate (29 parts), styrene (4.5 parts), n-butyl acrylate (9 parts), 2-hydroxyethyl methacrylate (7 parts), methacrylic acid (0.5 part), di-tert.-butyl peroxide (1.5 parts) and the solvent mixture as above (27 parts) is heated at 135° C for about 5 hours. The reaction product is admixed with the solvent mixture as above (40 parts) to give a resin solution containing 50.2% of non-volatile components and having a viscosity of R to S, an acid value of 4.6 and a color number of 3. No mercapto group is detected in this resin solution. When the solution is evaporated to dryness, a uniform and transparent resin is obtained.

The above resin solution obtained by the graft polymerization (100 parts) is admixed with "Superbeckamine J-820" (30 parts) and "Tipake R-820" (50 parts) to make an enamel, which is applied on an iron plate treated with a phosphate by spraying and baked at 120° C for 30 minutes to form a film on the plate. The properties of the obtained film are shown in Table 2.

EXAMPLE 4

In the same reaction vessel as in Example 1, there are charged phthalic anhydride (597 parts), trimethylolethane (190 parts), neopentylglycol (179 parts) and monothioethylene glycol (80 parts), and the contents are heated at 200° C for about 4.5 hours while introducing nitrogen gas therein. The reaction mixture is cooled to give a resin having an acid value of 52.3. The content of the mercapto group in the resin is $5 \times 10^{-5}$ gram equivalent/g.

The thus obtained resin (20 parts) is admixed with methyl methacrylate (30 parts), styrene (26 parts), n-butyl acrylate (10 parts), 2-hydroxyethyl methacrylate (10 parts), acrylonitrile (4 parts), laurylmercaptan (1.5 parts), di-tert-byty peroxide (1.5 parts) and the solvent mixture as in Example 1 (101.5 parts), and the mixture is heated at 130° C for about 6 hours to give a resin solution, which contains 51.7% of non-volatile components and has a viscosity of V, an acid value of 14.2 and a color number of 3. No mercapto group is detected in this resin solution. When the solution is evaporated to dryness, a uniform and transparent resin is obtained.

The above resin solution obtained by the graft polymerization is admixed with the same materials as in Example 3 to make an enamel, which is applied on an iron plate treated with a phosphate by spraying and baked at 120° C for 30 minutes to form a film on the plate. The properties of the obtained film are shown in Table 2.

EXAMPLE 5

In the same reaction vessel as in Example 1, there are charged palm oil (300 parts), trimethylolpropane (193 parts), pentaerythritol (121 parts) and calcium hydroxide (0.31 part), and the contents are heated at 230° C for 20 minutes while introducing nitrogen gas therein to execute the ester interchange. To the reaction mixture, phthalic anhydride (394 parts) and thioglycollic acid (50 parts) are added, and the resultant mixture is heated at 220° C for about 7 hours. The reaction mixture is cooled to give a resin having an acid value of 34.2. The content of the mercapto group in the resin is $4.28 \times 10^{-4}$ gram equivalent/g.

The thus obtained resin (40 parts) is admixed with methyl methacrylte (30 parts), styrene (6 parts), n-butyl acrylate (10 parts), 2-hydroxyethyl methacrylate (10 parts), acrylonitrile (4 parts), di-tert-butyl peroxide (1.5 parts) and the solvent mixture as in Example 1 (101.5 parts), and the mixture is heated at 120° C for about 7 hours to give a resin solution, which contains 49.1% of non-volatile components and has a viscosity of UV to V, an acid value of 3.7 and a color number of 4. No mercapto group is detected in this resin solution. When the solution is evaporated to dryness, a uniform and transparent resin is obtained.

The above resin solution obtained by the graft polymerization (80 parts) is admixed with a nitrocellulose solution (½ second; non-volatile components, 20%) (60 parts) and titanium white (trade name "Tipure R-900" manufactured by E. I. DuPont Co., Ltd.) (30 parts) to make an enamel, which is applied on an iron plate treated with a phosphate by spraying and dried at room temperature for 7 days to form a film on the plate. The properties of the obtained film are shown in Table 2.

EXAMPLE 6

In the same reaction vessel as in Example 1, there are charged phthalic anhydride (550 parts), trimethylolpropane (279 parts), neopentyl glycol (197 parts) and thioglycollic acid (50 parts), and the contents are heated at 220° C for about 6 hours while introducing nitrogen gas therein. The reaction mixture is cooled to give a resin having an acid value of 36.6. The content of the mercapto group in the resin is $2.40 \times 10^{-4}$ gram equivalent/g.

In a 1 liter volume column reaction vessel equipped with a stirrer, a thermometer, a cooler and an inlet for nitrogen, a 0.3% aqueous solution of hydroxypropylmethylcellulose (600 parts) is charged, and a mixture of the above obtained resin (86 parts), methyl methacrylate (80 parts), n-butyl acrylate (20 parts), styrene (55 parts), glycidyl methacrylate (35 parts), 2-hydroxyethyl methacrylate (10 parts), t-dodecyl mercapto (4 parts) and 2,2'-azobis-2,4-dimethylvaleronitrile (3 parts) is added thereto. The contents are stirred under nitrogen stream to make a dispersion. The temperature is elevated up to 70° C over 10 minutes, and stirring is continued for 5 hours at the same temperature whereby a pearly graft product in solid state is obtained. The thus obtained resin is transparent and is not gelatinized, being completely dissolved in butyl acetate. No mercapto group is detected in the resin. The glass transition temperature of the resin is 43° C, and its weight average molecular weight is 15100.

The above obtained resin (700 parts) is admixed uniformly with dodecyl dicarboxylic acid (62 parts), "Epikote-1004" (trade name; manufactured by Shell Chemical Co., Ltd.) (40 parts), "Sumimal-M-100" (trade name; melamine resin manufactured by Sumitomo Chemical Co., Ltd.) (15 parts), "Modaflow" (trade name; manufactured by Monsanto Co., Ltd.) (8 parts) and "Tipake R-820" (200 parts) by the aid of a supermixer, and the mixture is treated by an extruder at 110° C. The product is crushed into fine powders by the use of a powdering machine ("Atomizer" manufactured by Fuji Ind. Co., Ltd) and passed through a shieve of 150 mesh to give a powdery paint. The powdery paint is applied on an iron plate treated with a phosphate by the electrostatic coating and baked at 200° C for 20 minutes in a hot air furnace so as to form a film of about 80 μ in thickness on the plate. The properties of the obtained film are shown in Table 2.

EXAMPLE 7

A mixture of the mercapto group-containing alkyd resin obtained in Example 6 (40 parts), methyl methacrylate (80 parts), styrene (20 parts), n-butyl acrylate (40 parts), 2-hydroxyethyl methacrylate (20 parts) and 2,2'-azobis-2,4-dimethylvaleronitrile (4 parts) is treated in the same manner as in Example 6 to obtain a pearly resin, which is transparent and is not gelatinized, being completely dissolved in butyl acetate. No mercapto group is detected in the resin. The glass transition temperature of the resin is 40° C, and its weight average molecular weight is 35000.

As in Example 6, the above obtained resin (320 parts), cellulose acetate butyrate "EAB-531-1" (trade name; manufactured by Eastman Chemical Products, Inc.) (80 parts), "Tipake R-820" (250 parts) and "Modaflow" (5 parts) are treated to obtain a paint, which is applied on an iron plate to form a film. The gloss of the obtained film is 90 at 60°, and the pencil hardness is F (Mitsubishi Uni). The film is excellent in thermal fluidity, smoothness and adherence, and is not influenced by the irradiation of ultraviolet ray (15 W × 30 cm (irradiation height) × 24 hours).

REFERENCE EXAMPLE 1

An alkyd resin solution is prepared in the same manner as in Example 1 but thioglycollic acid is not employed. The obtained solution contains 60.0% of non-volatile components and has a viscosity of W to X, an acid value of 6.25 and a color number of 1.

Then, the graft polymerization reaction is executed as in Example 2 to give a resin solution containing 50.5% of non-volatile components and having a viscosity of Y; and acid value of 5.0 and a color number of 1. The resin is extremely turbid.

Table 1

|  | Example 1 | Example 2 |
|---|---|---|
| Workability | Good | Good |
| Smoothness | Excellent | Excellent |
| Gloss (at 60°) | 78.3 | 75.5 |
| Pencil hardness | 3H | 4H |
| Adherence (Cross cut, Erichsen, 6 mm extrusion) | 100/100 | 87/100 |
| Impact resistance (500 g × ½ inch) | above 50 cm | 30 cm |

Table 2

|  | Example 3 | Example 4 | Example 5 | Example 6 |
|---|---|---|---|---|
| Spraying workability | Very good | Very good | Very good | Good |
| Smoothness | Very good | Good | Very good | Very good |
| Gloss (at 60°) | above 100 | 89 | 92 | 92 |
| Pencil hardness | 4H | 4H | H | 2H |
| Adherence (Cross cut, Erichsen, 6 mm extrusion) | 100/100 | 100/100 | 100/100 | 100/100 |
| Impact resistance[1] | 25cm | 15cm | 30cm | 40cm |
| Water resistance[2] | Good | Good | Good | Good |
| Gasoline resistance[3] | 3H | 3H | F | 2H Very good |
| Acid resistance[4] | Good | Good | Good |  |
| Alkali resistance[5] | Very good | Very good | Good. | Very good |

Note:
[1] 500 g × ½ inch except Example 5 where is 300 g × ½ inch;
[2] 40° C × 7 days except Example 5 where is 40° C × 3 days;
[3] determined 2 hours after dipping at 20° C for 24 hours except Example 5 where determination is made 2 hours after dipping at 20° C for 30 minutes;
[4] 0.1 N H₂SO₄ aqueous solution, 20° C × 24 hours;
[5] 5 N NaOH aqueous solution, 20° C × 4 hours.

What is claimed is:

1. A coating composition containing a resin produced by graft polymerizing one or more ethylenically unsaturated polymerizable compounds onto a mercapto group-containing alkyd resin in a weight ratio of 5:95 to 70:30 said mercapto group-containing alkyd resin having mercapto groups in an amount of $1 \times 10^{-5}$ to $1 \times 10^{-2}$ gram equivalent/g, and said ethylenically unsaturated polymerizable compound(s) being one or more members selected from the group consisting of esters of acrylic acid and methyacrylic acid with alkanols having 1 to 15 carbon atoms, styrene, α-methylstyrene, vinyltoluene, p-t-butylstyrene, acrylonitrile, methacrylonitrile, etylenically unsaturated glycidyl carboxylates, ethylenically unsaturated monomers having at least one hydroxyl group, ethylenically unsaturated carboxylic acids, ethylenically unsaturated compounds having at least one blocked isocyanate group, acrylamide, methacrylamide, N-methylolacrylamide, N-alkoxymethylacrylamide having an alkyl moiety of 1 to 14 carbon atoms, diacetone acrylamide, hydroxymethyldiacetone acrylamide, N-methlolmethacrylamide, and N-alkoymethylmethacrylamide having an alkyl moiety of 1 to 14 atoms said resin having a glass transition temperature of 5° to 100° C and a weight average molecular weight of 5,000 to 100,000.

2. The coating composition according to claim 1 comprising further at least one organic solvent.

3. The coating composition according to claim 1 comprising further at least one of cellulose derivatives, acrylic resins or alkyd resins.

4. The coating composition to claim 1 comprising further at least one of aminoplast compounds, organic compounds having at least two carboxyl groups and epoxy compounds.

* * * * *